US009919877B2

United States Patent
Kempf et al.

(10) Patent No.: US 9,919,877 B2
(45) Date of Patent: Mar. 20, 2018

(54) END OF TRAVEL ARRANGEMENT (71) Applicants: Scot Christopher Kempf, Macomb, MI (US); James Michael Weitz, Ortonville, MI (US); Jeffrey William Hamden, Troy, MI (US)

(72) Inventors: Scot Christopher Kempf, Macomb, MI (US); James Michael Weitz, Ortonville, MI (US); Jeffrey William Hamden, Troy, MI (US)

(73) Assignee: Knight Industries, Auburn Hills, MI (US)

( * ) Notice: Subject to any disclaimer, the term of this patent is extended or adjusted under 35 U.S.C. 154(b) by 435 days.

(21) Appl. No.: 14/722,186

(22) Filed: May 27, 2015

(65) Prior Publication Data

US 2016/0297617 A1 Oct. 13, 2016

Related U.S. Application Data (60) Provisional application No. 62/145,048, filed on Apr. 9, 2015.

(51) Int. Cl.
*B65G 43/00* (2006.01)

(52) U.S. Cl.
CPC .................... *B65G 43/00* (2013.01)

(58) Field of Classification Search
CPC ...................................... B65G 43/00
See application file for complete search history.

(56) References Cited

U.S. PATENT DOCUMENTS

| | | | | | |
|---|---|---|---|---|---|
| 3,854,406 | A | * | 12/1974 | Monne | B61C 13/04 104/108 |
| 4,408,539 | A | * | 10/1983 | Wakabayashi | B61B 3/00 104/172.4 |
| 4,646,646 | A | * | 3/1987 | Swilley | E01B 25/26 104/100 |

\* cited by examiner

*Primary Examiner* — Richard Chang
(74) *Attorney, Agent, or Firm* — John R. Benefiel (57) ABSTRACT

An end of travel arrangement for shutting down an assembly line conveyor when an ergo assist arm at a conveyor station moves beyond an end of travel limit point, the end of travel arrangement including a trolley rail mounted alongside one of a pair of runway rails for supporting an ergo assist arm carriage with the trolley movable along the trolley rail. One or more proximity switches are mounted aligned with a home position on the trolley and detect when the trolley is displaced from the home position by contact of a feature on the carriage with the trolley and generate signals immediately initiating shutting down of the assembly line conveyor.

5 Claims, 7 Drawing Sheets

END OF TRAVEL ARRANGEMENT

CROSS REFERENCE TO RELATED APPLICATIONS

This application claims the benefit of U.S. provisional patent application No. 62/145,048 filed on Apr. 9, 2015.

BACKGROUND OF THE INVENTION

This invention concerns end of travel arrangements associated with a carriage for an ergo assist arm, used at workstations located along an assembly line to assist lifting and positioning of parts to be installed or for performing other operations. The end of travel arrangement stops an assembly line conveyor if the carriage reaches a predetermined limit in its range of motion alongside the assembly line.

Each ergo assist arm is typically supported on an associated carriage mounted on a pair of runway rails extending along one side of an assembly line conveyor, the carriage being movable along the runway rails so as to be able to move along with the auto body moved by the assembly line conveyor so as to be able to conduct an assembly or other operation on the moving auto body.

The ergo assist arm is disposed to enable an assembly line worker to carry out a particular operation while the carriage supporting the ergo assist arm is being moved parallel to the assembly line to match the motion of the auto body down the line. As a practical matter, there is a limited range of movement of the carriage and ergo assist arm along the runway rails, and the carriage will eventually reach an end of travel position if the assembly step or other operation is not completed in the normal interval allowed.

This is because the assembly line conveyor is continuously operated, and the auto body or other work will eventually advance beyond the limited range of travel of the ergo assist arm carriage.

This will cause the assembly line conveyor to pull the ergo assist arm from the station and possibly damaging the same.

Also, the auto body being assembled must not be advanced downstream to other stations along the assembly line where other assembly steps are to be carried out if an earlier assembly operation has not been completed in an upstream station.

For this reason, an end of travel arrangement has hereto been provided which is designed to stop the assembly line conveyor if movement of the carriage along the runway rails past a predetermined travel limit is detected. The end of travel arrangements have included one or more limit switches which when tripped sound an alarm when the end of travel arrangement trolley begins to exceed the limit of its normal range of motion. The assembly line conveyor control also receives a signal from a limit switch initiating a stoppage of the assembly line conveyor which stops after the inertia of assembly line motion is dissipated. The continuous nature of the alarm commonly leads to efforts by plant personnel in an attempt to disable the switches to turn off the alarm, often damaging the switches in the effort.

In these prior designs using mechanical limit switches, a dog feature on the carriage engages and trips the limit switch when the carriage reaches the designed for end of travel point, to thereby detect such over travel occurrence.

Since such limit switches have a trip element which is mechanically engaged in order to be operated, over time deformation of the trip element can result in a failure of the carriage dog feature to make contact with the switch trip element and result in a failure of the end of travel arrangement to shut down the assembly line conveyor when over travel occurs.

As noted above, vigorous efforts are often attempted after the alarm has sounded to physically deactivate the switch as with a pole or broom handle. The limit switches are typically mounted in an exposed location since a mechanical engagement with the switch trip element is necessary, and thus, vigorous efforts such as banging on the exposed limit switches by assembly line workers sometimes occur, often resulting in damage to the limit switches to the extent that the end of travel arrangement becomes inoperative. Extensive repairs and an extended assembly line shutdown may then be necessary.

In some situations, it would be desirable to allow continued limited manual movement of an ergo assist arm carriage by a substantial advance of the carriage after an automatic shutdown of the assembly line has occurred, as to enable repositioning a part carried by the ergo assist arm in order to prepare for a restart of the assembly line conveyor.

It is an object of the present invention to provide a more reliable and durable end of travel arrangement for automatically shutting down an assembly line conveyor when over travel of the carriage supporting the ergo assist arm is detected.

It is a further object to provide an end of travel arrangement which is shielded against being damaged by any attempt to interfere with an end of travel detection switch.

It is yet another object to provide an end of travel arrangement which allows a substantial manual movement of the ergo assist arm support carriage after a conveyor shut down so as to enable repositioning of the ergo assist arm after the conveyor has been shut down.

SUMMARY OF THE INVENTION

The above recited objects and other objects which will be understood by those skilled in the art are achieved by an end of travel arrangement installed on one of the carriage supporting runway rails, the end of travel arrangement including an end of travel trolley rail mounted to one of the runway rails and a trolley movable on the trolley rail to be movable alongside and parallel to the runway rails which extend alongside the assembly line conveyor. The trolley mounts support rollers enabling it to run along the trolley rail after the carriage makes contact therewith when the carriage reaches the end of the designed for range of travel.

The end of travel trolley is normally held positioned against a stop defining a home position along the trolley rail by a spring balancer which exerts a pull on the trolley holding it against the stop. The end of trolley in its home position is engagable by a tow plate fixed to the carriage when the carriage reaches the end of its normal range of travel along the runway rails.

One or more proximity sensors are located above a metal block on the trolley when the trolley is in the home position so as to detect the presence of the trolley at its home position and to also detect when the trolley is pushed away from its home position after being contacted by a tow plate on the carriage when it reaches the end of its designed for normal range of motion along the runway rails. Movement of the trolley away from its home position is detected by one or more proximity switches sending signals to the assembly line conveyor initiating a shutdown of the assembly line conveyor which ceases after a momentary lag. Two proximity switches are preferred to be used to keep the end of travel functional even if one of the proximity switches fail and also to make it more difficult to manually deactivate the switches as with a piece of metal. A single switch generating an alarm and shutting down the conveyor could also be employed.

Both proximity switches are preferably mounted side by side in a protective carrier housing which is mounted to one end of the trolley rail as by a bolt passing through the lower end of the carrier housing sides and the sides of the trolley rail.

A plastic nonmagnetic mounting bar may be mounted in the carrier housing so as to extend through two sides of the housing, the bar having threaded holes which each receive one of the two proximity switches to be held side by side and vertically upright within the carrier housing in a locked upright position. The bar is not made from ferromagnetic material so does not itself activate the switches.

A horizontal partition plate may be fixed within the carrier housing and projects over the end of the trolley rail, secured thereto as by a threaded fastener passing through a notch in the outer edge of the plate and threaded into a nut engaged with the top of the end of travel rail holding the carrier housing upright in a locked position.

Loosening the threaded fastener may allow the partition plate and attached carrier housing to be swung up to expose the lower ends of the proximity switches so as to facilitate adjustment of the positions of the lower ends of proximity switches to ensure that they are flush with the undersurface of the plastic mounting bar.

The end of travel trolley can be manually rolled along the trolley rail for a substantial distance beyond the home position to allow movement of the ergo assist arm supporting carriage along the runway rails to accommodate the continued brief movement of the assembly line conveyor after the shut down signal has been sent and also to enable further movement of the carriage necessary for a manual repositioning of a part supported by the ergo assist arm or to carry out some other maneuver necessary to prepare for restart of the assembly line conveyor.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
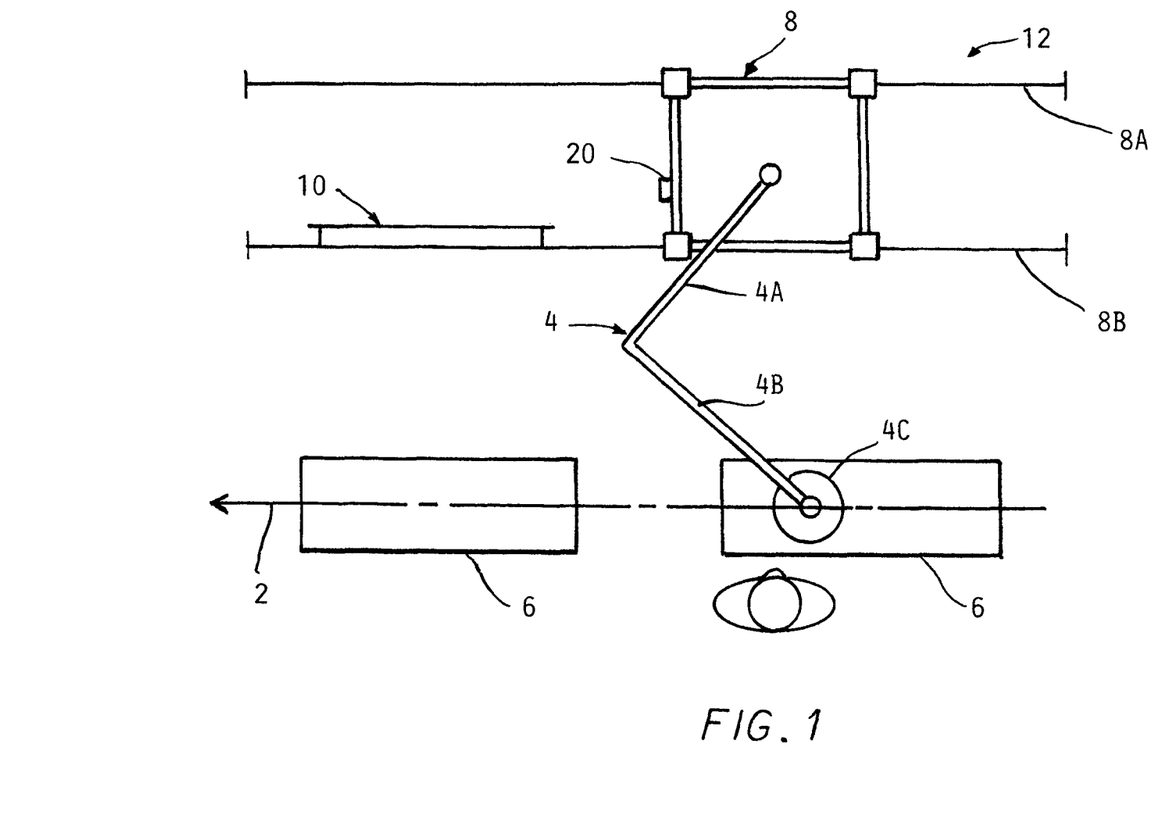
FIG. 1 is a diagram of a section of an assembly line conveyor, an ergo assist arm, a support carriage for the ergo assist arm and the end of travel arrangement according to the present invention.
Figure 2:
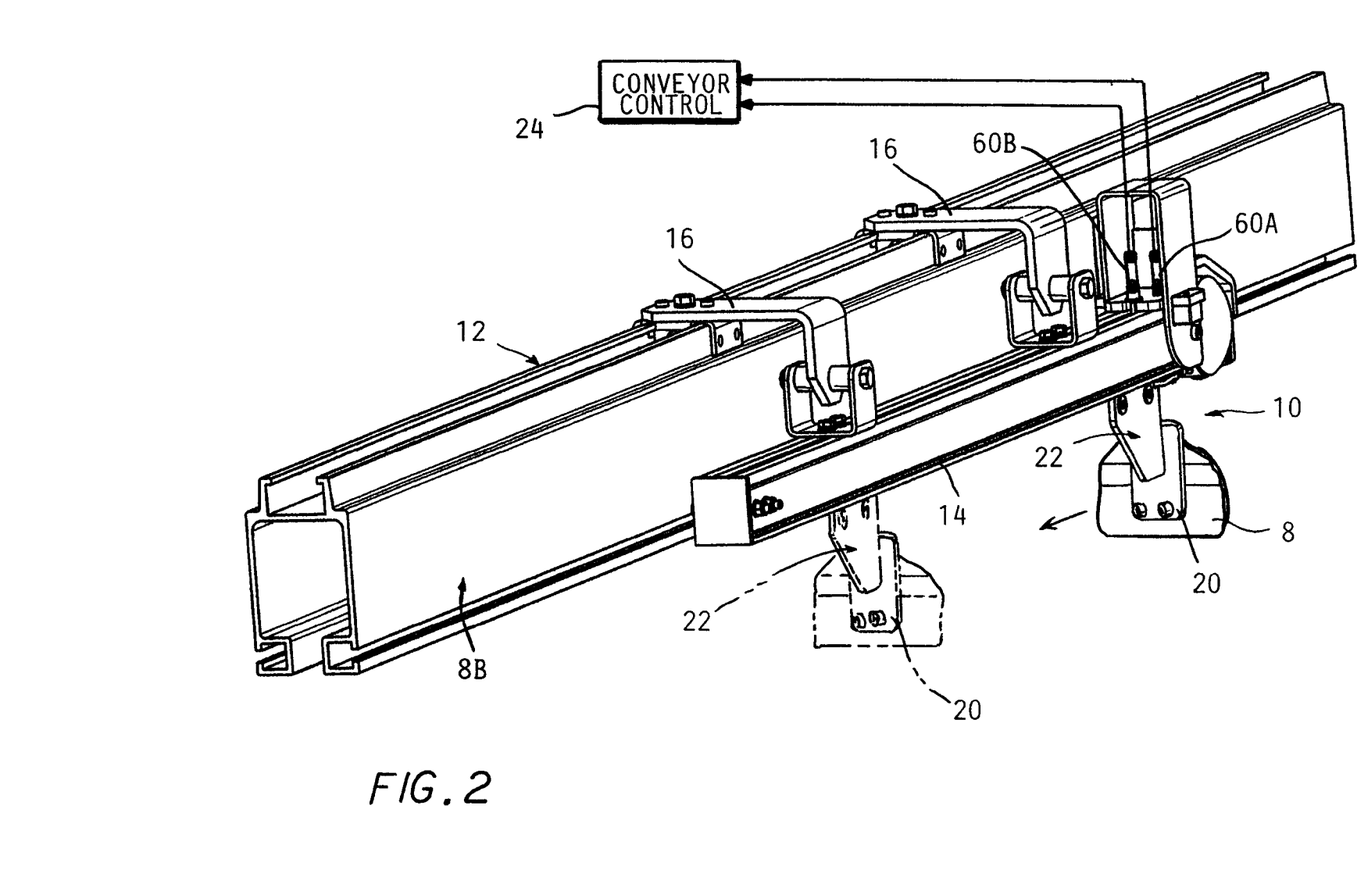
FIG. 2 is a pictorial view of an end of travel arrangement installed alongside one of the runway rails together with block diagram representation of an assembly line conveyor control.

Referring to the Drawings and particularly to FIGS. 1 and 2, a linear assembly line power conveyor 2 is depicted diagrammatically, such as one typically used in assembling car bodies 6 conveyed along an assembly line by continuous operation of the conveyor 2.

At various work stations along the assembly line conveyor 2, there is typically provided an apparatus 12 including an ergo assist arm 4 or other similar device used to support and position a part to be assembled to the car body 6 or to perform some other operation on the car body 6 at the station. The ergo assist arm 4 has one member 4A connected to a support carriage 8 mounted for movement along a pair of parallel runway rails 8A, 8B which extend parallel to the assembly line conveyor 2.

The other member 4B of the ergo assist arm 4 may carry tooling 4C for performing an operation, holding a part, etc.

As noted, the runway rails 8A, 8B extend alongside and parallel to the assembly line conveyor 2. The ergo assist arm 4 may be pulled along the runway rails 8A, 8B by the motion of the assembly line conveyor 2 during the operation at the station so as to not be moved relative to the car body as the operation is carried out.

That operation must be completed within a predetermined distance less than the length of the runway rails 8A, 8B so that no relative linear motion occurs between the car body and the tooling.

The end of travel arrangement 10 includes an end of travel trolley rail 14 attached by a pair of brackets 16 to one of the runway rails 8B and extending alongside and parallel thereto, as seen in FIGS. 1 and 2.

The carriage 8 (a fragmentary portion shown in FIG. 2) moves from right to left as seen in FIG. 2 in moving the ergo assist arm 4 matched to the car body movement caused by operation of the conveyor 2. The ergo assist arm 4 may be conveying a part to be assembled to a car body 6 or performing some other operation as mentioned above.

A tow plate 20 (also referred to as a trip dog) is attached to a leading end of the ergo assist arm supporting carriage 8, located so as to come into contact with one end of the trolley 22 which is mounted to movable along the trolley rail 14 as described further below.

If the tow plate 20 of the carriage 8 moves past the point of first contact with the end of travel trolley 22, the trolley 22 is moved away from its home position, which change in position is detected and a shut down signal is sent to an assembly line conveyor control 24 to initiate shut down.

This is caused by signals received from a pair of proximity switches 60A, 60B, these signals generated when a block 28 (FIG. 2) made of a ferromagnetic magnetic material is moved away from a home position of the trolley 22 where it is normally closely positioned to the lower ends of the proximity switches 60A, 60B.

Both of the proximity switches 60A, 60B produce a signal which generate a signal transmitted to the assembly conveyor control 24 causing an initiation of shutdown of the assembly line conveyor 2.

Alternatively, a single proximity switch able to produce both signals could be used.

The end of travel trolley 22 and ergo assist arm carriage 8 can continue to move due to the extension of the trolley rail 14 past the limited range of motion from the home position. This capability may be desirable in order to be able to move a part further after conveyor motion has ceased supported on the ergo assist arm carriage 8 or to carry out some other maneuver necessary to allow restart of the assembly line conveyor 2.

Figures 3, 3A:
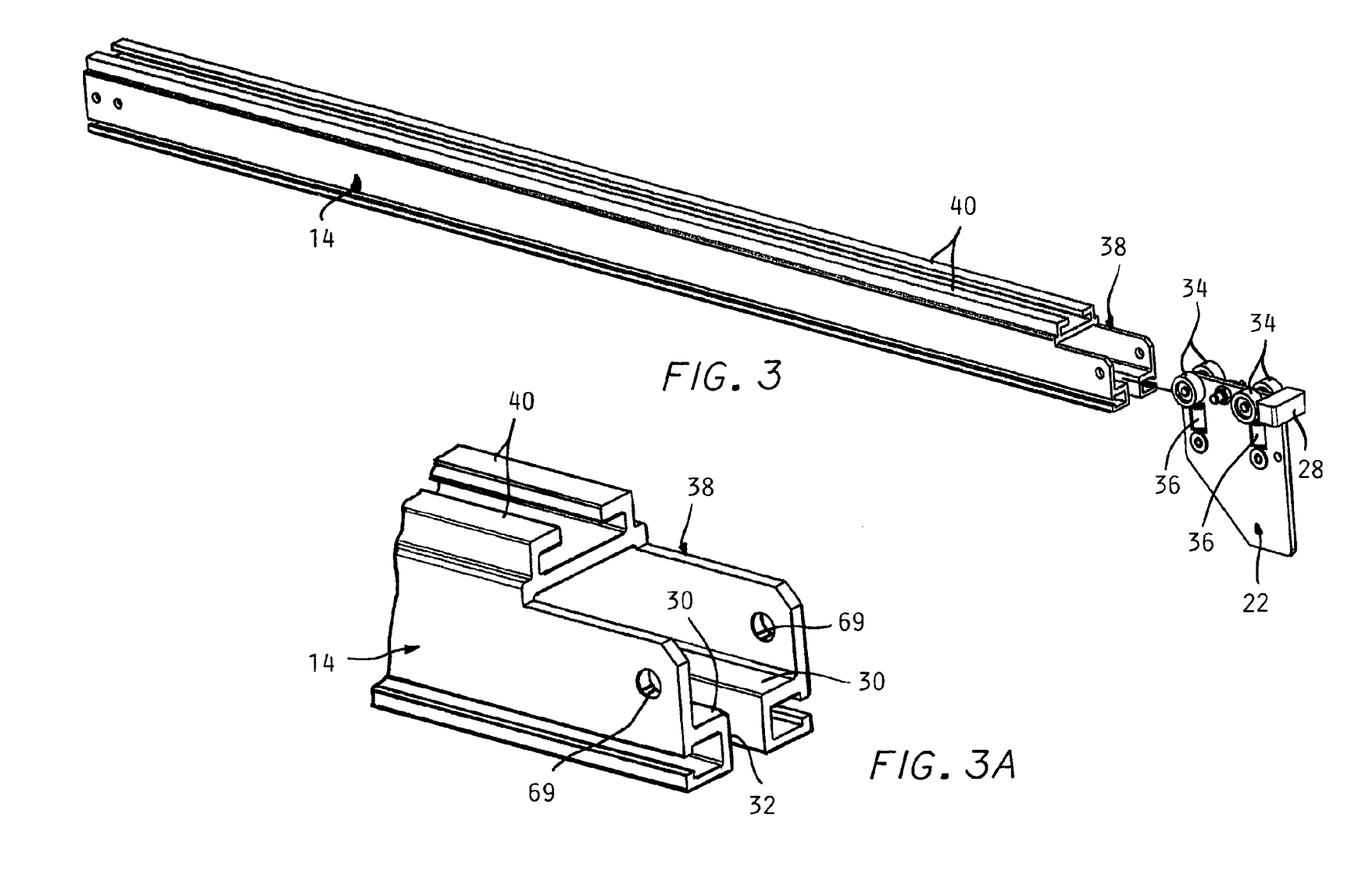
FIG. 3 is a pictorial view of a trolley rail included in the end of travel arrangement of FIG. 2 and an included trolley normally supported thereon separated therefrom.
FIG. 3A is an enlarged fragmentary view of one end of the trolley rail shown in FIG. 3.

Referring to FIGS. 3 and 3A, the trolley rail 14 may be constructed from an aluminum extrusion formed with a pair of interior lengthwise extending runner surfaces 30 separated by a slot 32.

The end of travel trolley 22 has two sets of rollers 34 mounted on the upper side which allows free movement of the trolley 22 along the length of the runner surfaces 30 and the slot 32 formed in the trolley rail 14, allowing the body of the trolley 22 to pass therebetween.

Guide rollers 36 maintain a vertical orientation of the trolley 22.

The right end 38 of the trolley rail 14 is partially cut away as shown in FIG. 3 removing a top slot portion 40 in the vicinity of the home position of the trolley 22.

Referring to FIGS. 4, 4A, 5, 6 and 7, the end of travel arrangement 10 further includes a carrier housing 42 defined in part by a U-shaped piece 44 having sides 45A, 45B with a back plate 46 welded thereto and a support plate 48 extending across the piece 44 with ends 50 extending through cutouts 52 in the sides of the U-shaped piece 44 and welded thereto.

The carrier housing 42 preferably is of sturdy construction and substantially encloses the proximity switches 60A, 60B to protect the same from being damaged by misguided efforts to reset the same.

A thick plastic bar 54 overlies the support plate 48 also having ends extending through cut outs 52A with screws 56 passing through the ends of the bar 54 and received in threaded holes in ends 50A, 50B to attach the plastic (nylon) bar 54 to the underside of support plate 48.

The support plate 48 has a portion 48A which projects out beyond the U-shaped piece 44 having a notch 56 formed therein at its outer end which overlies the top of the track 40 of the trolley rail 14. A machine screw 58 secures the support plate 48 to the trolley rail 14 when tightened into a threaded plate 59 received within the track 40 of the trolley rail 14.

The pair of proximity switches 60A, 60B pass through respective holes 62 in the support plate 48 to be aligned with threaded holes 64 in the bar 54. Switch 60A, 60B when activated generate signals when the trolley 22 moves away from its home position, which are both sent to the conveyor control 24 to stop the power conveyor 2, which control 24 occurs after a brief lag due to its inertia.

The carrier housing 44 is pivotably connected to the trolley rail 14 by a shoulder bolt 66 passing through aligned holes 67 in the sides 45A, 45B of U-shaped piece 44 as well as through aligned holes 69 in the sides of trolley rail 14 with a nut and washer 70, 71 retaining the same in position.

A plastic spacer-stop block 72 is placed in the inside of the U-shaped piece 44 at the rear thereof with a through hole 74 allowing the bolt 66 to pass through and secure the spacer stop block 72 in position.

The spacer/stop block 72 has an upper bar portion 76 which extends across the surfaces 30 at the end of the trolley rail 14.

Figure 4:
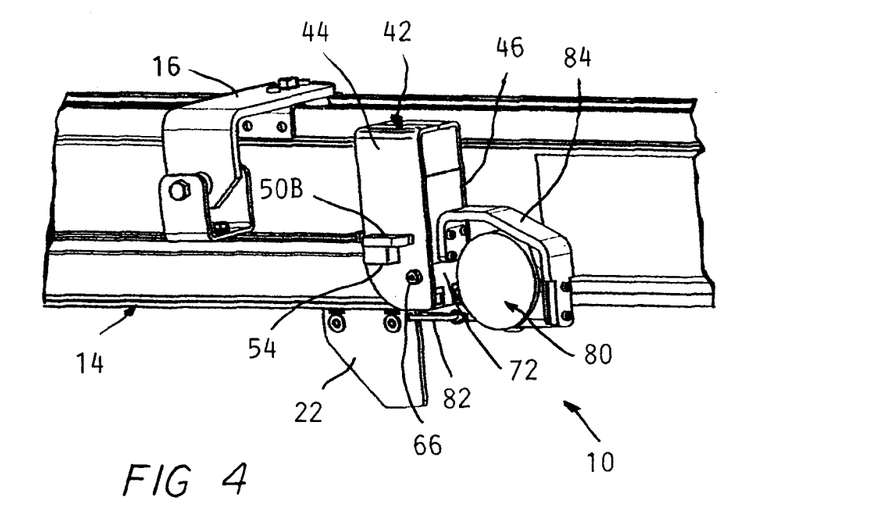
FIG. 4 is a fragmentary enlarged pictorial view of a segment of one of the runway rails components of the end of travel arrangement shown in FIG. 2 mounted thereto.
Figure 4A:
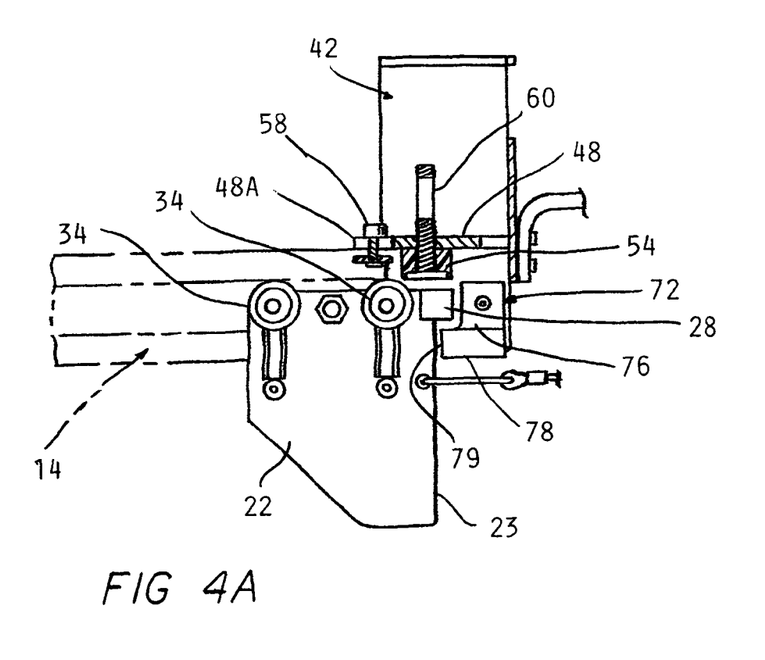
FIG. 4A is an enlarged side view of some of the components of the end of travel arrangement shown in FIG. 4.

The block 72 also has a bottom bar portion 78 integral with the upper bar portion 76 extending beneath and across the top portion 76 which is received in the slot 32 between the surfaces 30 of the trolley rail 16 and projecting forward of the top portion 76 to define a stop for the trailing edge 23 of the end of travel trolley 22 to locate the metal block feature 28 directly beneath the bar 54 and the lower ends of proximity sensors 60A, 60B so as to allow its presence to be reliably detected (FIG. 4A).

A spring balancer 80 has a cable connection 82 to trolley 22 to exert a moderate force pulling the trolley edge 23 against the end 79 of the spacer stop block lower portion.

Such spring balancers are commercially available and allow the end of travel trolley 22 to move a substantial distance down the trolley rail 14 as seen in FIG. 2 without a great increase in the spring force to gently return the trolley 22 to its home position. This accommodates substantial movement of the carriage 8 after contacting the trolley 22 accommodating a brief continuance of the conveyor 2 and to allow repositioning of a part (not shown) as necessary.

Figure 8:
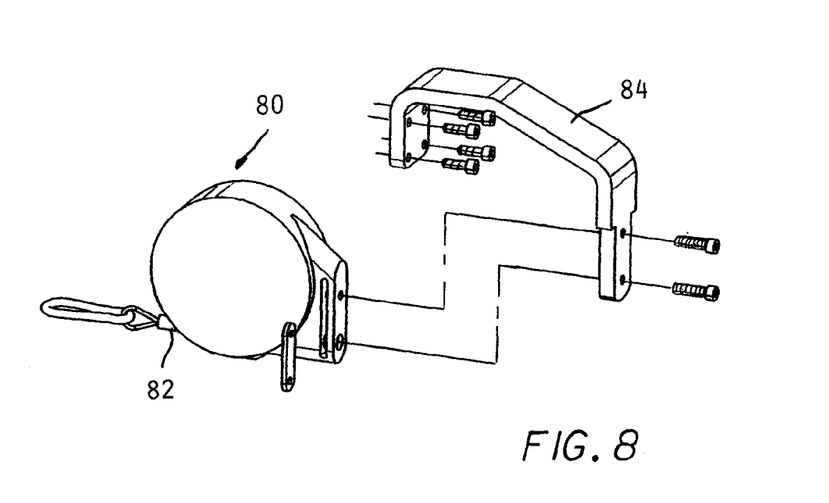
FIG. 8 is an exploded pictorial view of a balancer spring and mounting components therefore included in the end of travel arrangement shown in FIG. 2.

A mounting bracket 84 (FIG. 8) attached to the spring balancer 80 and to the rear of the plate 46 with small screws as shown secures the spring balancer 80 to the housing 42.

Figure 5:
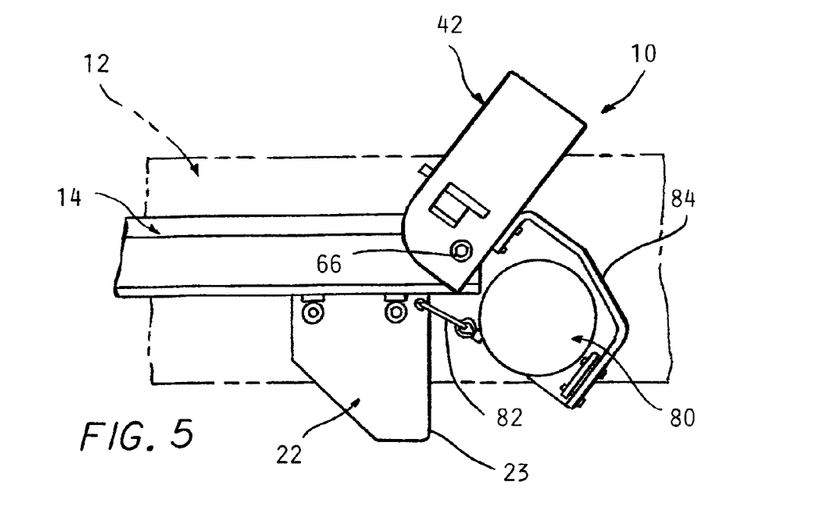
FIG. 5 is a side elevational view of components of the end of travel arrangement shown in FIGS. 4 and 4A with a carrier housing included therein partially pivoted back from a normal upright position.
Figure 6:
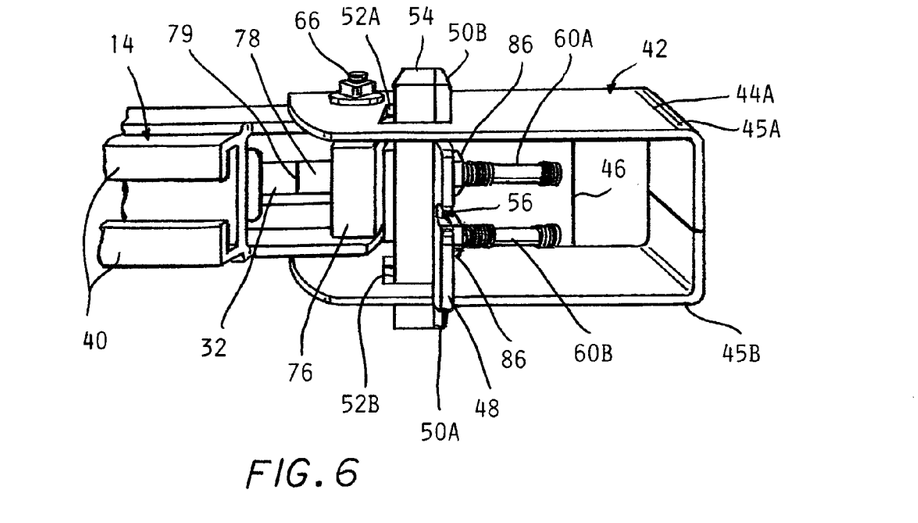
FIG. 6 is a top view of the carrier housing shown in FIG. 5 in a fully pivoted back position to enable accurate adjustment of the position of the ends of proximity switches mounted therein.
Figure 7:
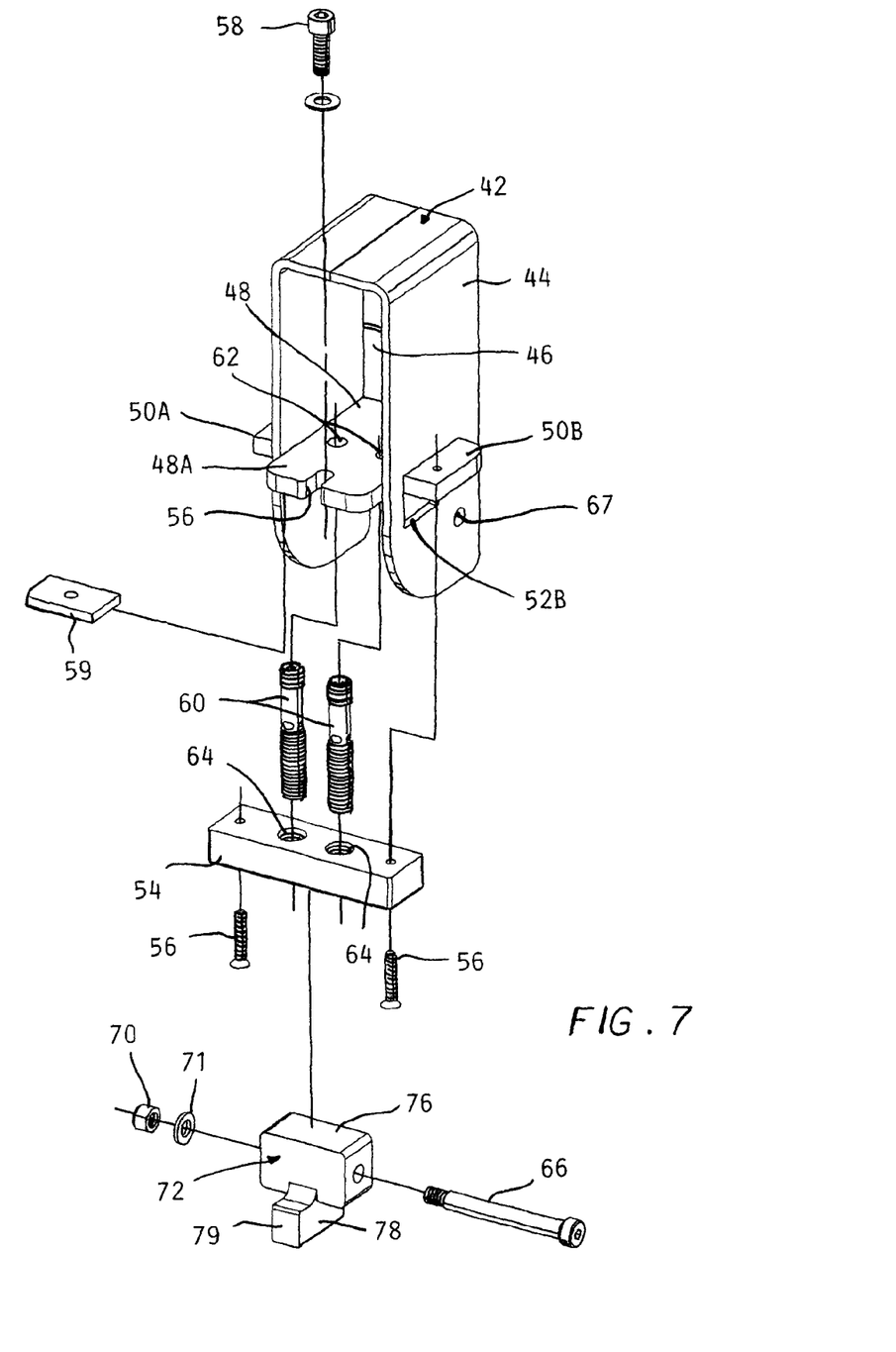
FIG. 7 is a partially exploded pictorial view of the components assembled to the carrier housing shown in FIGS. 4, 4A and 5.

The machine screw 58 may be removed to allow pivoting back the housing 44 as seen in FIGS. 5 and 6.

This conveniently allows an adjustment of the position of the lower ends of the proximity switches 60 so as to be flush to the bottom of the bar 54 to be positioned very close to the block feature 28 while not contacting the same.

Locking nuts 86 secure the proximity switches 60A, 60B in a correctly adjusted position.

Figure 9:
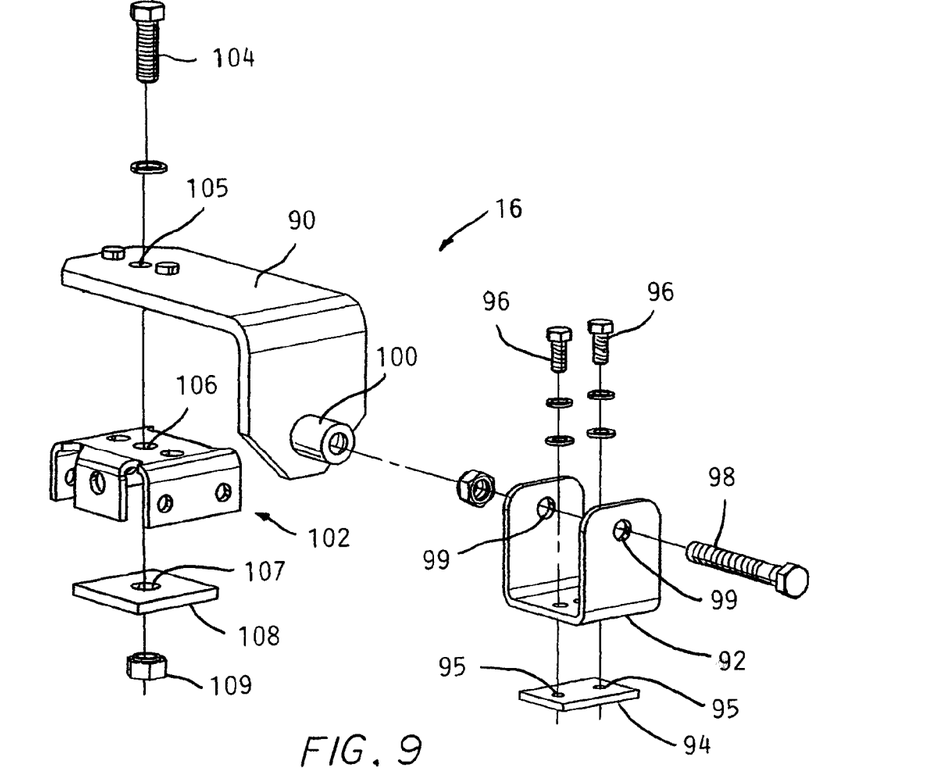
FIG. 9 is an exploded pictorial view of the components of one of the two identical bracket assemblies used to attach the trolley rail to one of the runway rails.

Referring to FIG. 9, details of the brackets 16 which connects the trolley rail 14 to a runway rail 8B are shown.

An angle piece 90 is connected at one end to a U-shaped standard bracket piece 92 which rests atop the track 40 atop the trolley rail 14. A small plate 94 is inserted within the track 40 and connected by two screws 96 received in threaded holes 95 to the bottom of the U-shaped piece 92.

A bolt 98 passes through holes 99 in the sides of the U-shaped piece 92 and a tube 100 inserted between the sides of the U-shaped piece 92 to be captured.

A bracket 122 is installed in the runway rail 8B and secured with a bolt 104 passing through a holes 105, 106 in angle piece 90, and a hole 107 in a plate 108, secured together with a nut 109.

The invention claimed is:

1. An end of travel arrangement associated with an assembly line conveyor and a station thereof including a carriage supporting an ergo assist arm used to perform an operation on a part advanced by said assembly line conveyor, said carriage movable along a pair of runway rails extending parallel to and alongside said assembly line conveyor, said end of travel arrangement including a trolley rail mounted alongside one of said runway rails with a portion thereof located relative to said one runway rail at an end of travel point beyond which said carriage is not designed to reach during normal operations;

an end of travel trolley mounted on said trolley rail to be able to be moved along said trolley rail but normally being positioned stationary at a home position along said trolley rail;

interengagable respective features on said carriage and said travel trolley located to come into engagement with each other by travel of said carriage along said runway rails to said end of travel point and thereby displacing said trolley from said home position by continued movement of said carriage past said end of travel point;

one or more proximity switches mounted located alongside said trolley at said end of travel point so as to detect said end of travel trolley at said home position, and when said end of travel trolley is displaced away from said home position, said one or more proximity switches generating corresponding electronic signals in response to said displacement away from said home position, said signals transmitted to an assembly line conveyor control causing shut down of said assembly line conveyor after said trolley is displaced from said home position.

2. The end of travel control arrangement according to claim 1 wherein a housing supporting said one or more proximity switches is attached to said portion of said trolley rail.

3. The end of travel control arrangement according to claim 2 wherein said housing mounts said one or more proximity switches so as to position a sensing end thereof just above a location whereat a feature on said end of travel trolley is located when said end of travel trolley is in said home position.

4. The end of travel control arrangement according to claim 3 wherein said housing is pivotally mounted to said trolley rail so as to allow pivoting up from said end of said trolley rail to expose to view said sensing ends of said one or more proximity switches, said proximity switches adjustably mounted on said housing to be able to be set to a position just above said trolley feature to detect said trolley being at said home position.

5. The end of travel control arrangement according to claim 1 wherein said end of travel trolley rail extends beyond said end of travel point a distance sufficient to enable continued selective manual movement of said carriage beyond said end of travel point after said engagement of said carriage feature with said trolley feature.

* * * * *